Aug. 13, 1968 R. E. KORTUM 3,396,809
DRIVE ASSEMBLY FOR POWERED MOWER
Filed Feb. 16, 1966 4 Sheets-Sheet 1

INVENTOR
ROBERT E. KORTUM
BY
Cohn and Powell
ATTORNEYS

Aug. 13, 1968

R. E. KORTUM 3,396,809

DRIVE ASSEMBLY FOR POWERED MOWER

Filed Feb. 16, 1966

INVENTOR
ROBERT E. KORTUM
BY
Cohn and Powell

ATTORNEYS

Aug. 13, 1968  R. E. KORTUM  3,396,809
DRIVE ASSEMBLY FOR POWERED MOWER
Filed Feb. 16, 1966  4 Sheets-Sheet 3

INVENTOR
ROBERT E. KORTUM
BY
Cohn and Powell
ATTORNEYS

Aug. 13, 1968   R. E. KORTUM   3,396,809
DRIVE ASSEMBLY FOR POWERED MOWER
Filed Feb. 16, 1966   4 Sheets-Sheet 4

INVENTOR
ROBERT E. KORTUM
BY
Cohn and Powell
ATTORNEYS

United States Patent Office 3,396,809
Patented Aug. 13, 1968

3,396,809
DRIVE ASSEMBLY FOR POWERED MOWER
Robert E. Kortum, Hazelwood, Mo., assignor to Atlas Tool & Manufacturing Co., St. Louis, Mo., a corporation of Missouri
Filed Feb. 16, 1966, Ser. No. 527,895
15 Claims. (Cl. 180—19)

ABSTRACT OF THE DISCLOSURE

The assembly includes a frame supporting a prime mover and a transmission means. An output shaft extends outwardly from the transmission means and is connected by spring-type universal joints to a pair of drive shafts. Each drive shaft mounts a drive wheel member engageable with a ground wheel. A bracket is pivotally mounted to each side of the frame, each bracket including a swivel bearing rotatively mounting the drive shaft and providing an actuating means swinging the drive member into driving engagement with its associated ground wheel. A handle pivotally mounted to the frame, is interconnected to the actuating means by a toggle mechanism having one arm connected to the frame and the other arm connected to the swivel bearing of the bracket.

---

This invention relates generally to improvements in a lawn mower, and more particularly to an improved drive assembly for a powered mower.

An important object is achieved by the provision of a universal connection between a rotatively mounted drive shaft and a power transmission means mounted on a mower frame and operatively swinging the drive shaft about the universal connection to bring a drive member rotatable with the drive shaft into or out of driving engagement with one of the ground wheels mounted on the mower frame.

Another important object is realized by the disposition of the universal connection between the drive shaft and output shaft of the power transmission means, the universal connection including a torsion spring disposed over and attached to the drive and output shafts, the torsion spring being wound to tighten when the output shaft is driven to provide the driving connection between such shafts.

Still another important objective is afforded by construction of the universal connection with a female part in either the drive shaft or output shaft and a male part in the other shaft swingably mounted in the female part, and with a torsion spring disposed over and attached to the drive shaft and output shaft. The torsion spring is wound so as to contract on the shafts when the output shaft is driven to provide the driving connection between such shafts in any relative angular position of the shafts.

An important object is attained by the provision of a pair of rotatively mounted drive shafts, one at each side of the mower frame, the drive members rotatable with the drive shafts engaging a pair of driven ground wheels at opposite sides of the frames, and by the provision of a universal connection between each drive shaft and the power transmission means. The actuating means selectively swings both drive shafts about their associated universal connections to bring the drive members into or out of driving engagement with the pair of ground wheels.

Another important objective is provided by the location of the power transmission means between the pair of driven ground wheels, the transmission means including an output shaft extending toward each of the driven ground wheels, and by the provision of a universal connection between the output shaft and each associated adjacent drive shaft.

Yet another important objective is achieved in that the torsion springs utilized in the universal connections between the output shaft and the oppositely disposed and associated drive shafts are oppositely wound. For example, one torsion spring of one universal connection is a left-hand spring, while the torsion spring of the other universal connection is a right-hand spring. With this structural arrangement of the left-hand and right-hand torsion springs, the springs will be tightened when the output shaft is driven to provide an effective driving connection between the output shaft and oppositely extending and associated drive shafts.

An important objective is realized by rotatively mounting the drive shaft in a bracket pivotally mounted to the mower frame, and by the provision of means interconnecting the bracket to a handle pivotally mounted to the frame for pivoting the bracket to swing the drive shaft about its universal connection and to bring the drive member into or out of driving engagement with its associated driven ground wheel as the handle is pivotally moved to different positions.

Another important objective is afforded by the provision of a toggle having one arm operatively connected to the drive shaft and the other arm connected to the frame, and by the provision of a rod interconnecting the handle and toggle to extend or fold the toggle as the handle is lowered or raised respectively, whereby to pivot the bracket and swing the drive shaft, and bring the drive member out of or into engagement respectively with its associated driven ground wheel.

A further important objective is attained by the provision of a spring attached to the bracket and frame tending to urge the bracket in a direction to swing the drive shaft and bring the drive member into engagement with the driven ground wheel, and tending to fold the toggle and hold the handle in a raised position.

An important objective is provided by rotatively mounting the drive shaft in a bearing that is swivelly mounted on the bracket, the bearing swivelling as the drive shaft is swung about its universal connection when the bracket is pivoted upon manipulation of the handle.

Another important objective is achieved by the structural arrangement of a toggle interconnecting the handle and bracket, the toggle having first and second arms pivotally connected together. The first toggle arm includes opposed cups embracing opposite sides of the swivel bearing to hold the bearing in assembly with the bracket and to mount the first toggle arm pivotally to the bracket. The second toggle arm is pivotally mounted to the frame.

It is an important objective to provide a drive assembly for a powered mower that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawings, in which.

Figure 1:
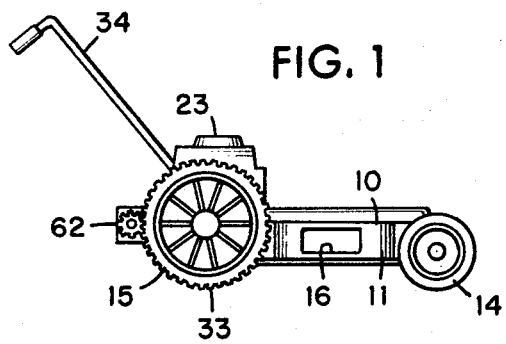
FIG. 1 is a side elevational view of the lawn mower, illustrating the handle in a raised position with the drive members operatively engaging the driven ground wheels.
Figure 2:
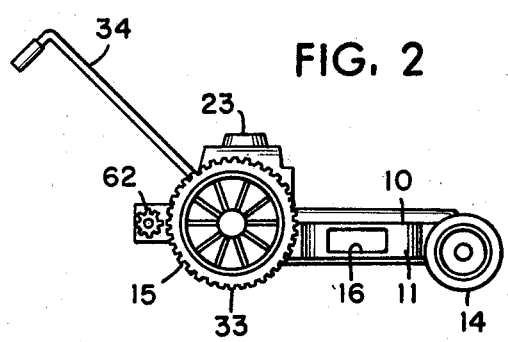
FIG. 2 is a side elevational view of the lawn mower, similar to FIG. 1, but illustrating the handle in a lowered position with the drive members disengaged from the driven ground wheels.

Referring now by characters of reference to the drawing, and first to FIGS. 1 and 2, it will be understood that the improved drive assembly is utilized in a lawn mower having a deck 10 with depending skirt portions 11 defining a cutting chamber 12 (FIG. 6) in which a cutting blade 13 is turned. The mower deck 10 is supported at the front by a pair of front, free-wheeling ground wheels 14, one of which is located at each side of the deck 10. The rear of the mower deck 10 is supported by a pair of rear driven ground wheels 15, one of which is located at each side of such deck 10. A lateral discharge opening 16 is formed in the skirt portion 11 of deck 10 through which grass cuttings are discharged from the cutting chamber 12 by the action of blade 13.

Figure 5:
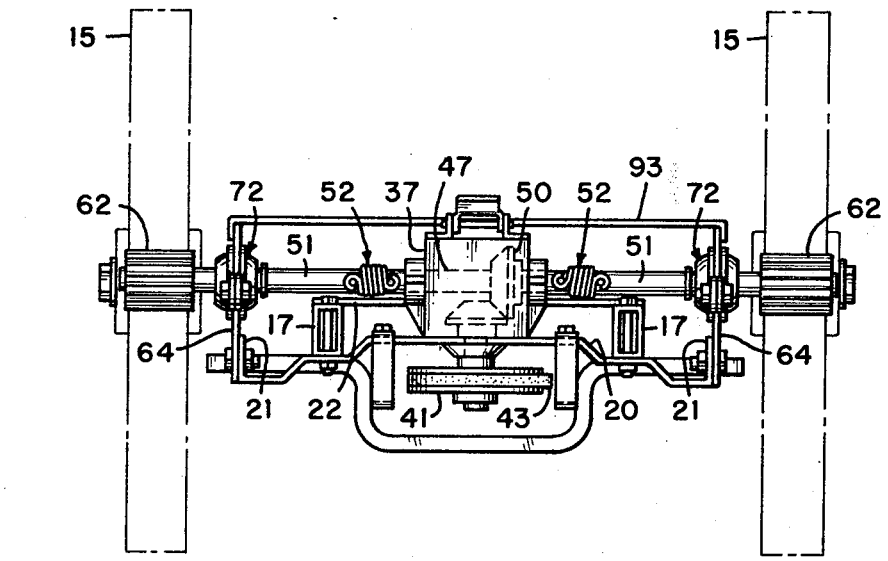
FIG. 5 is a rear elevational view of the drive assembly as taken along the line 5—5 of FIG. 3.
Figure 6:
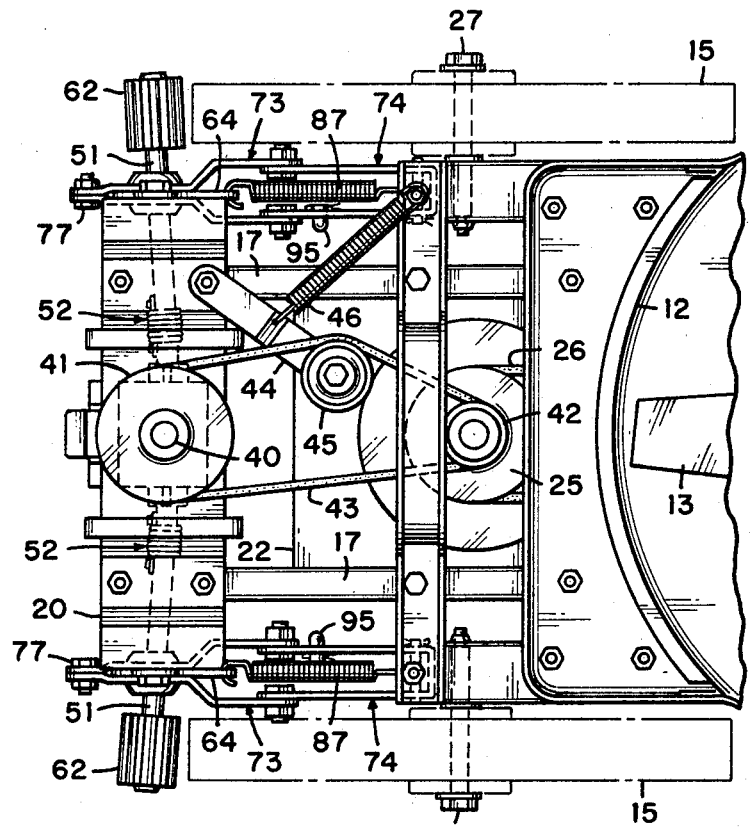
FIG. 6 is a bottom plan view of the drive assembly.

From FIGS. 5 and 6, it will be apparent that a pair of laterally spaced, elongate box channels 17 are fastened to the mower deck 10 and extend rearwardly therefrom. The rear ends of the box channels 17 are operatively interconnected by a cross plate 20 having opposed, upturned side flanges 21. Secured to the top of and extending between the box channels 17 is a platform 22.

An engine 22, constituting a prime mover, is mounted on and carried by the platform 22. The engine 23 includes a drive shaft 24 depending below the platform 22. Mounted on and rotatable with the engine drive shaft 24 is a pulley 25 operatively connected to the cutting blade 13 through a belt drive 26 in the conventional manner.

It will be understood that the front ground wheels 14 are idlers, serving to support and guide the mower. However, the rear ground wheels 15 are so-called driven wheels, serving to propel the mower during cutting operation.

Each of the driven ground wheels 15 includes a stub axle 27 located in any one of a plurality of vertically spaced holes 30 formed in the laterally spaced vertical flanges 31 of an associated U-shaped wheel bracket generally indicated by 32. The axle of the driven ground wheel 15 is selectively located in one of the flange holes 30 and is fixed to the bracket 32 so as to determine the height of the mower deck 10, and hence determine the height of the cutting blade 13. It will be understood that there are a pair of U-shaped wheel brackets 32 attached to the top of the frame deck 10 and extending rearwardly therefrom, one such bracket 32 being located at each side of the frame deck 10 to accommodate one of the driven ground wheels 15.

The rear driven ground wheels 15 are provided with rubber tires, the peripheries of which include teeth 33. The purpose and function of such teeth 33 will become clear upon later description of parts.

A handle 34 has spaced legs 35, the lower ends of which are located between the spaced flanges 31 of the wheel brackets 32 at opposite sides of the frame deck 10. The handle legs 35 are pivotally mounted to the wheel brackets 32 by bolts 36. The handle 34 is utilized to guide and push the lawn mower in the usual manner. In addition, the handle 34 is utilized to condition the drive assembly selectively for self-propelling operation.

The drive assembly includes a gear box 37, constituting a power transmission means, fixed to the cross plate 20 immediately behind the engine 23 and between the rear driven ground wheels 15. The gear box 37 includes an input shaft 40 depending substantially vertical below the cross plate 20. A pulley 41 is mounted on and rotatable with the input shaft 40. The pulley 41 is located substantially in the same horizontal plane with a coacting pulley 42 mounted on the drive shaft 24 of engine 23, the pulleys 41 and 42 being operatively interconnected by a continuous belt 43. It is an important object of the present drive assembly to have and maintain the pulley 41 in a fixed position, parallel with the drive pulley 42.

To maintain an effective driving connecting of the belt 43 with the cooperating pulleys 41 and 42, a belt tensioner is provided, the belt tensioner including an arm 44 pivoted to the underside of the cross plate 20 and including an idler pulley 45 rotatively mounted to the opposite end of the arm 44. Preferably, the idler pulley 45 engages the inside of one span of belt 43. A tension spring 46 has one end operatively connected to the tensioner arm 44 and the other end operatively connected to the underside of one wheel bracket 32, the spring 46 tending to pivot the arm 44, and hence tending to urge the idler pulley 45 against the belt 43 in order to maintain its tension for effective driving action.

In addition, the gear box 37 includes a transverse output shaft 47 having ends projecting from each side of the box 37 toward the opposed driven ground wheels 15. The input shaft 40 and output shaft 47 are operatively interconnected by a pair of meshing bevel gears 50.

Drivingly connected to each end of the output shaft 47 is a drive shaft 51. The mounting and connection of each drive shaft 51 is identical so that a detailed description of one will suffice for the other. For clarity, the same reference numerals will be used to indicate corresponding parts.

Figure 7:
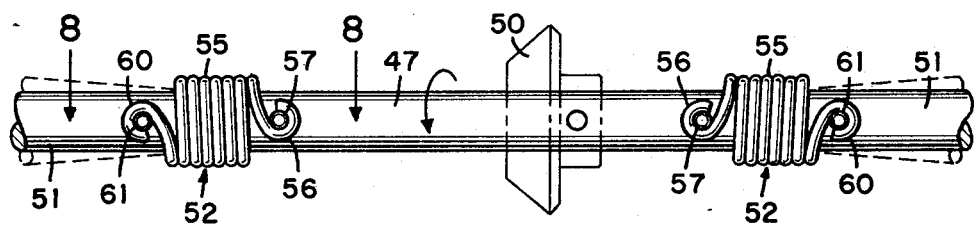
FIG. 7 is an enlarged, fragmentary side elevational view of the universal connections between the outlet shaft of the power transmission means and the oppositely extending and associated drive shafts.
Figure 8:
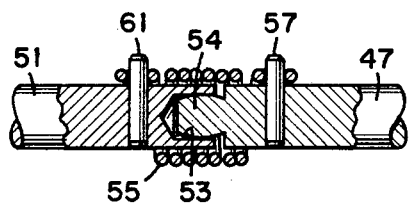
FIG. 8 is a cross-sectional view of a universal connection as taken along line 8—8 of FIG. 7.
Figure 9:
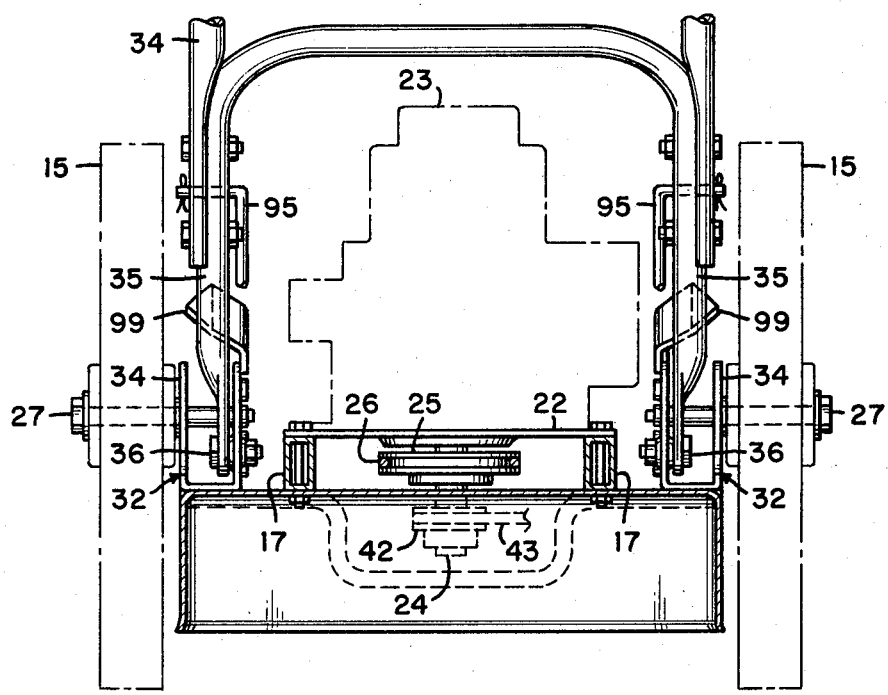
FIG. 9 is a cross-sectional view as taken along staggered line 9—9 of FIG. 4.

As is best seen in FIGS. 7 and 8, a universal connection generally indicated by 52 operatively interconnects the end of output shaft 47 with an end of a drive shaft 51. The universal connection 52 includes a socket 53 (FIG. 8), constituting a female part, formed in the end of drive shaft 51. Swingably received and located in the socket 53 is a compatible plug 54, constituting a male part, formed integrally on the end of the output shaft 47. A coil, torsion spring 55 is located over and about the mating ends of the output shaft 47 and drive shaft 51 in the region of connection of the plug 54 in the socket 53. One end 56 of torsion spring 55 is fixed by pin 57 to output shaft 47, while the opposite spring end 60 is fixed to the drive shaft 51 by pin 61.

It will be importantly understood that the torsion spring 55 is wound in a direction sf that the spring 55 will tighten on the shafts 47 and 51 when the output shaft 47 is driven, whereby to provide an effective driving connection between the shafts 47 and 51 and to maintain the assembly of plug 54 in socket 53 in any relative angular position of such shafts 47 and 51. This universal connection 52 enables the drive shaft 51 to move angularly in any direction relative to the output shaft 47. When considering the complete assembly of a pair of drive shafts 51 attached by a pair of such universal connections 52 to the opposite ends of output shaft 47, it will be understood that the respective torsion springs 55 of such universal connections 52 are oppositely wound, i.e., one torsion spring is left-hand wound while the other torsion spring is right-hand wound, so that upon rotation of the output shaft 47 in a predetermined direction, these springs 55 of the pair of universal connections 52 will both tighten to provide the functional advantages and results mentioned previously.

Mounted on and rotatable with each drive shaft 51 is a drive member 62, constituting a pinion, having teeth adapted to engage and mesh with the teeth 33 of an associated driven ground wheel 15. In the preferred embodiment, the pair of drive members 62 operatively engage their associated and coacting driven ground wheels 15 at the rear of such wheels 15.

Figure 10:
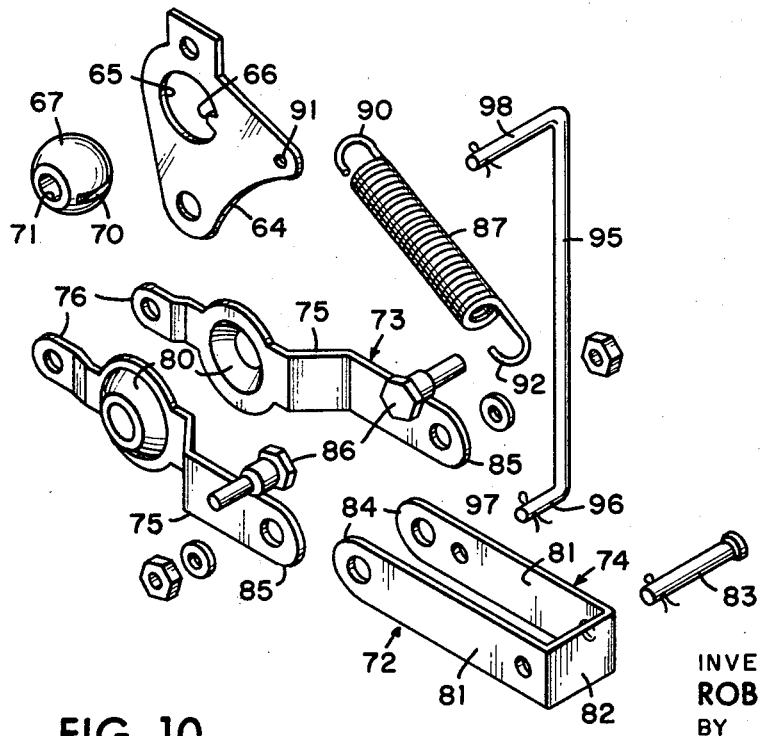
FIG. 10 is an exploded perspective view of the bracket, swivel bearing and toggle interconnecting the drive shaft with the actuating handle.

Actuating means is provided to swing the drive shafts 51 about their universal connections 52 to bring the drive members 62 selectively into or out of driving engagement with their associated driven ground wheels 15. The actuating means, operatively interconnecting each drive shaft 51 with the handle 34, are identical so that a detailed description of one such assembly will suffice for the other. Again, the same reference numerals will be utilized to indicate corresponding parts. Perhaps the detailed construction of these parts is best shown in FIG. 10.

Pivotally mounted by pin 63 to each side flange 21 of cross plate 20 is a bracket 64. Formed in each bracket 64 is an aperture 65 having an inwardly projecting key 66. The aperture 65 is substantially circular and rotatively receives a ball bearing 67, constituting a swivel bearing. The ball bearing 67 is provided with a transverse keyway 70 receiving the key 66. The slidable interconnection of the key 66 in the keyway 70 enables swivelling action of the ball bearing 67 in a predetermined plane. Formed through the ball bearing 67 is a transverse bore 71 through which the associated drive shaft 51 extends. The ball bearing 67 rotatively mounts the drive shaft 51 for rotation, and mounts the drive shaft 51 to the bracket 64 for swinging movement of the drive shaft 51 upon pivoting of the bracket 64.

Operatively interconnecting each bracket 64 with the mower frame is a toggle referred to by 72. Each toggle 72 includes a first toggle arm generally indicated by 73 and a second toggle arm generally indicated by 74.

The first toggle arm 73 includes a pair of identical links 75 arranged in oppositely disposed relation, one on each side of the associated bracket 64. The outer ends 76 are secured together by a fastener 77. Each of the toggle links 75 includes a cup 80. The cups 80 receive and rotatively mount the ball bearing 67 on opposite sides of the bracket 64, whereby to provide a pivot connection for the toggle arm 73 to the bracket 64.

The second toggle arm 74 is substantially U-shaped, having opposite legs 81 interconnected by a transverse integral strip 82. The second toggle arm 74 is located within the spaced flanges 31 of an associated wheel bracket 32. The legs 81 of the second toggle arm 74 are pivotally mounted to the flanges 31 by a pivot pin 83. The toggle 72 is thereby operatively connected to the mower frame.

The ends 84 of the legs 81 of the second toggle arm 74 are pivotally connected to the ends 85 of the links 75 of the first toggle arm 73 by a pair of pivot pins 86.

Figure 3:
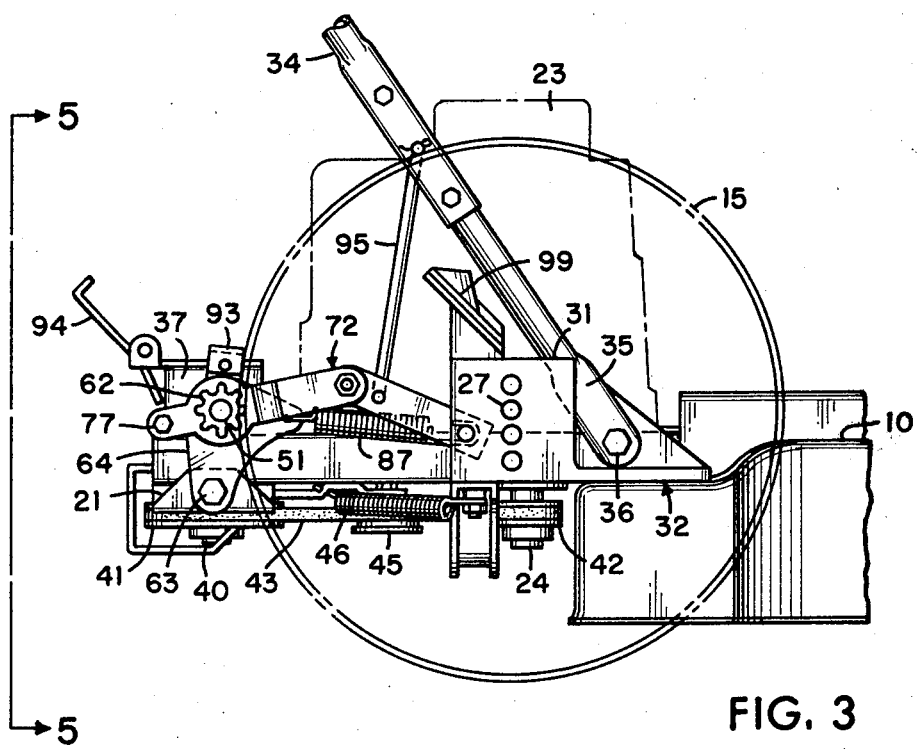
FIG. 3 is a side elevational view of the drive assembly with the associated driven ground wheels in broken lines for clarity, showing the positions assumed by the component parts under driving operation as shown in FIG. 1.
Figure 4:
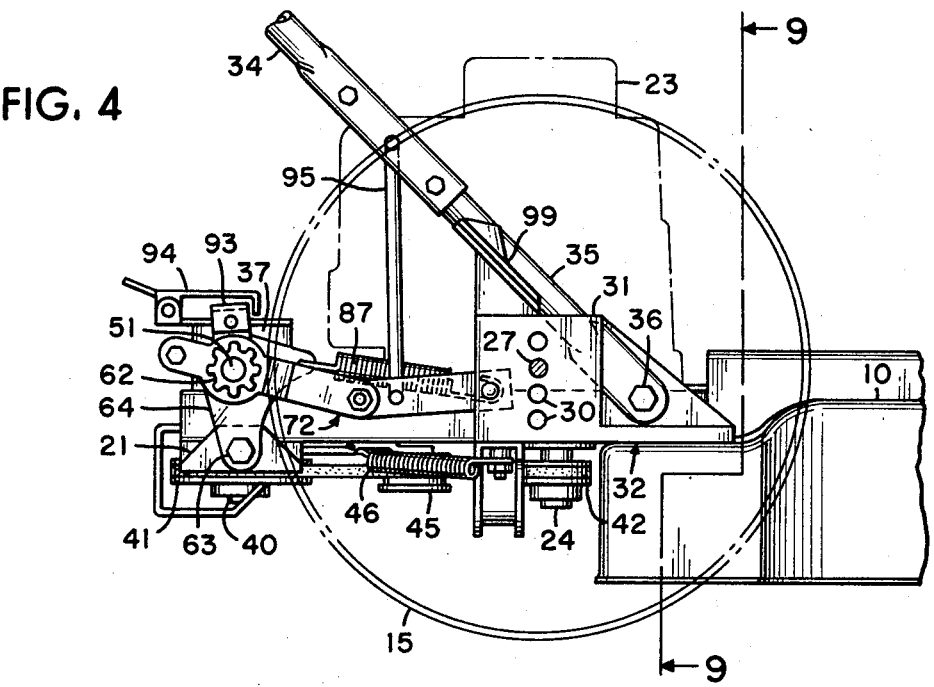
FIG. 4 is a side elevational view, similar to FIG. 3, but illustrating the positions of the component parts of the drive assembly when effectively disengaged as shown in FIG. 2.

When the toggles 72 are extended preferably to a slightly over-center position as is illustrated in FIG. 4, the toggles 72 push the bracket 64 rearwardly about their pivot connections, and thereby swing the drive shafts 51 rearwardly about their universal connections 52 so as to bring the drive members 62 out of driving engagement with their associated driven ground wheels 15. Conversely, when the toggles 72 are moved to their folded positions as shown in FIG. 3, the brackets 64 are pulled forwardly about their pivot connections so as to swing the drive shafts 51 forwardly about their associated universal connections 52, whereby to bring the drive members 62 into driving engagement with their associated driven ground wheels 15.

A tension spring 87 is associated with each toggle 72. Specifically, each spring 87 has one end 90 fastened to the associated bracket 64 through hole 91, and has the opposite end 92 connected to the pivot pin 83. These springs 87 tend to pull the brackets 64 forwardly, tend to urge the drive members 62 into driving engagement with their associated driven ground wheels 15, tend to hold the toggles 72 in their folded positions shown in FIG. 3, and thereby tend to hold the handle 34 in its raised position.

Operatively interconnecting each of the toggles 72 with the handle 34 is an elongate rod 95, one end 96 of which is fastened to leg 81 of the second toggle arm 74 by insertion through a compatible hole 97, while the other end 98 of which is fastened to one of the handle ends 35. When the handle 34 is moved to its raised position as shown in FIGS. 1 and 3, the handle 34 acts through the rods 95 to break and move the toggles 72 to their folded positions, and thereby pulls the brackets 64 forwardly to swing the drive shafts 51 forwardly and bring the drive members 62 into driving engagement with the driven ground wheels 15. When it is desired to operatively disengage the drive members 62 from their associated driven ground wheels 15, the handle 34 is moved downwardly to its lowered position as illustrated in FIGS. 2 and 4. The handle 34 acts through the rods 95 to extend the toggles 72 to push the bracket 64 rearwardly and thereby swing the drive shafts 51 rearwardly, and bring the drive members 62 out of driving engagement with the ground wheels 15. It is desirable under these circumstances to move the toggles 72 to a slightly over-center position so that the toggle arms 73 and 74 lock under the action of the springs 87 and the weight of handle 34 to hold the drive members 62 away from the driven ground wheels 15.

In order to limit the downward movement and define the lowered position of handle 34, each of the wheel brackets 32 is provided with a stop 99 engaging the associated handle leg 35. The engagement of the handle legs 35 with the bracket stops 99 enable the user, by pressing down on the handle 34, to raise the front end of the mower to facilitate guiding of the mower, as for example, upon reversing the direction of the mower at the end of a cut. It is important, when raising the front end of the mower, incident to swinging the mower around or otherwise changing the direction of movement, to disengage the drive members 62 and driven ground wheels 15 so that the ground wheels 15 can freely turn to provide a differential action.

Extending across the top of the gear box 37 and fastened to the oppositely disposed brackets 64, is a latch bar 93. Pivotally mounted on the gear box 37 is a catch lever 94. When the drive members 62 are moved out of driving engagement with the driven ground wheels 15 as shown in FIG. 4, the catch lever 94 can be selectively moved downwardly over the latch bar 93 to preclude any forward movement of the latch bar 93 that would permit unintentional or accidental re-engagement of the drive member 62 with the driven ground wheels 15. The latch bar 93 and catch lever 94 cooperate and function as a safety device that may be selectively manipulated by the user to prevent powered propulsion of the mower.

It is thought that the operation of the drive assembly has become fully apparent from the foregoing detailed description of parts, but for completeness of disclosure, the usage of the mower will be briefly described. It will be assumed that initially the drive assembly is operatively disengaged with the handle 34 in its fully lowered position as illustrated in FIGS. 2 and 4. In this position, the toggles 72 are extended by rods 95 to a slightly over-center position so that the drive shafts 51 are swung rearwardly by brackets 64 to disengage the drive members 62 from the driven ground wheels 15. If desired, the catch lever 94 can be moved down over the latch bar 93 as a safety precaution. The handle legs 35 rest on the bracket stops 99.

Now, the engine 23 can be energized. The cutting blade 13 is turned by the drive connection provided by drive pulley 25 and coacting belt 26. Simultaneously, the drive shafts 51 and their associated drive members 62 are rotated by engine 23. More particularly, the drive pulley 42 acting through the belt 43 rotates the pulley 41 mounted on the input shaft 40 of the gear box 37. Consequently, the output shaft 47 is rotated through the interengagement of bevel gears 50. The output shaft 47 rotates the drive shafts 51 through the respective universal connections 52, and consequently, the drive members 62 are rotated.

When it is desired to propel the mower forwardly, the catch lever 94 is raised to release the latch bar 93. Then the handle 34 is moved upwardly to its raised position as shown in FIGS. 1 and 3. The handle 34 acting through the rods 95 break and fold the toggles 72 to pull the brackets 64 forwardly, and hence swing the drive shafts 51 forwardly about their universal connections 52 to bring the drive members 62 into operative, meshing engagement with the driven ground wheels 15. The ground wheels 15 now propel the mower.

When it is desired to stop the mower or to change its direction, the handle 34 is moved to its lowered position as shown in FIGS. 2 and 4, as determined by the seating of the handle legs 35 on the bracket stops 99. In this lowered position, the rods 95 extend the toggles 72 to their slightly over-center positions to push the brackets 64 rearwardly, and hence swing the drive shafts 51 rearwardly to disengage the drive members 62 from the driven ground wheels 15.

The mower can then be conditioned for subsequent propulsion by simply raising the handle 34. When the handle 34 is in the raised position, the springs 87 assist in pulling the brackets 64 forwardly and tend to urge the drive members 62 against their associated driven ground wheels 15. In addition, the springs 87 tend to hold the toggles 72 in their folded positions and tend to hold the handle 34 in its raised position.

Although the invention has been described by making detailed reference to a single preferred embodiment, such detail is to be understood in an instructive, rather than in any restrictive sense, many variants being possible within the scope of the claims hereunto appended.

I claim as my invention:
1. In a mower:
  (a) a frame,
  (b) a prime mover mounted on the frame,
  (c) ground wheels rotatively mounted on and supporting the frame,
  (d) a power transmission means mounted on the frame and operatively connected to the prime mover,
  (e) a drive shaft rotatively mounted on the frame for swinging movement relative to the frame,
  (f) a universal connection operatively interconnecting the drive shaft and power transmission means,
  (g) a drive member mounted on and rotatable, in substantially fixed axial alignment, with the drive shaft, and
  (h) actuating means operatively interconnected to the drive shaft for selectively swinging the drive shaft and the drive member about the universal connection to bring the drive member into or out of driving engagement with one of the ground wheels.
2. The mower as defined in claim 1, in which:
  (i) the power transmission means includes an output shaft,
  (j) the universal connection is between the drive shaft and the output shaft of the power transmission means, and
  (k) the universal connection includes a single wound torsion spring disposed over and positively attached to the outer periphery of each of the said shafts, the torsion spring being wound to tighten when the output shaft is driven to provide a driving connection between the drive shaft and the output shaft.
3. The mower as defined in claim 1, in which:
  (i) one of the ground wheels is located at each side of the frame,
  (j) an independent drive shaft is rotatively mounted at each side of the frame,
  (k) a drive member is mounted on and rotatable with each drive shaft in substantially fixed axial alignment with its associated drive shaft, the drive members engaging a pair of ground wheels at opposite sides of the frame,
  (l) a universal connection operatively interconnects each drive shaft to the power transmission means, and
  (m) the actuating means selectively swings both drive shafts about their associated universal connections to bring both drive members into or out of driving engagement with the pair of ground wheels at the same time.
4. The mower as defined in claim 3, in which:
  (n) the power transmission means is located between the said pair of ground wheels and includes an output shaft extending toward each said ground wheel,
  (o) each universal connection is between one of the drive shafts and associated output shaft.
  (p) each universal connection includes a single wound torsion spring disposed over and positively attached to the outer periphery of each drive shaft and associated output shaft, the torsion spring being wound to tighten when the output shaft is driven to provide a driving connection between the output shaft and associated drive shaft, and
  (q) the torsion springs are oppositely wound.
5. The mower as defined in claim 3, in which:
  (n) the actuating means includes a bracket pivotally mounted to each side of the frame,
  (o) the drive shafts are rotatively mounted in and carried by the brackets to orbit about the pivotal mounting of the brackets,
  (p) the frame includes a cross bar interconnecting the brackets as a unit to permit simultaneous orbital movement of the drive shafts,
  (q) a handle is pivotally mounted to opposite sides of the frame, and
  (r) means interconnects the handle with the brackets for pivoting the brackets to swing the drive shafts about their universal connections to bring the drive members into or out of driving engagement with their associated ground wheels as the handle is pivotally moved to different positions.
6. The mower as defined in claim 5, in which:
  (s) the means interconnecting the handle to each bracket includes a toggle and a bearing means, the toggle having one arm operatively connected by the bearing means to an associated drive shaft and the other arm operatively connected to the frame, and
  (t) a rod interconnects the handle to each toggle to extend or fold the toggle as the handle is lowered or raised respectively whereby to pivot the brackets and swing the drive shafts to bring the drive members out of or into driving engagement respectively with their associated ground wheels.
7. The mower as defined in claim 5, in which:
  (s) an independent bearing is swivelly mounted on each bracket, and
  (t) the drive shafts are rotatively mounted in and carried by the bearings, the bearings swivelling relative to the bracket when the drive shafts are swung about their universal connections as the brackets are pivoted upon manipulation of the handle.
8. The mower as defined in claim 7, in which:
  (u) the means interconnecting the handle and each bracket includes a toggle having first and second arms pivotally connected together,
  (v) the first toggle arm includes opposed cups embracing opposite sides of an associated swivel bearing to hold the bearing in assembly with the associated bracket and to mount the first toggle arm pivotally to the associated bracket,
  (w) the second toggle arm is pivotally mounted to the frame, and

(x) means interconnects the handle to each toggle to extend or fold the toggle as the handle is lowered or raised respectively, whereby to pivot the brackets and swing the drive shafts, and bring the drive members out of or into driving engagement respectively with their associated ground wheels.

9. The mower as defined in claim 1, in which:
(i) the actuating means includes a bracket pivotally mounted to the frame,
(j) the drive shaft is rotatively mounted and carried by the bracket,
(k) a handle is pivotally mounted to the frame, and
(l) means interconnects the handle and bracket for pivoting the bracket to swing the drive shaft about the universal connection to bring the drive member into or out of driving engagement with its associated ground wheel as the handle is pivotally moved to different positions.

10. The mower as defined in claim 9, in which:
(m) the means interconnecting the handle and bracket includes a toggle and a bearing means, the toggle having one arm operatively connected by the bearing means to the drive shaft and the other arm operatively connected to the frame, and
(n) a rod interconnects the handle and toggle to extend or fold the toggle as the handle is lowered or raised respectively, whereby to pivot the bracket and swing the drive shaft, and bring the drive member out of or into driving engagement respectively with its associated ground wheel.

11. The mower as defined in claim 10, in which:
(o) the means interconnecting the handle and bracket includes a spring attached to the bracket and frame tending to urge the bracket in a direction to swing the drive shaft and bring the drive member into driving engagement with the ground wheel, and tending to fold the toggle and hold the handle raised.

12. The mower as defined in claim 10, in which:
(o) the power transmission means includes an output shaft,
(p) the universal connection is between the drive shaft and the output shaft of the power transmission means, and
(q) the universal connection includes a torsion spring disposed over and attached to the said shafts, the torsion spring being wound to tighten when the output shaft is driven to provide a driving connection between the driven shaft and output shaft.

13. The mower as defined in claim 9, in which:
(m) an independent bearing is swivelly mounted on the bracket, and
(n) the drive shaft is rotatively mounted in and carried by the bearing, the bearing swivelling relative to the bracket when the drive shaft is swung about its universal connection as the bracket is pivoted upon manipulation of the handle.

14. The mower as defined in claim 13, in which:
(o) the means interconnecting the handle and bracket includes a toggle having first and second arms pivotally connected together,
(p) the first toggle arm includes opposed cups embracing opposite sides of the swivel bearing to hold the bearing in assembly with the bracket and to mount the first toggle arm pivotally to the bracket,
(q) the second toggle arm is pivotally mounted to the frame, and
(r) means interconnects the handle and toggle to extend or fold the toggle as the handle is lowered or raised respectively, whereby to pivot the bracket and swing the drive shaft, and bring the drive member out of or into driving engagement respectively with its associated ground wheel.

15. The mower as defined in claim 14, in which:
(s) the power transmission means includes an input shaft and an output shaft,
(t) a drive means operatively interconnects the prime mover with the input shaft of the power transmission means,
(u) the universal connection is between the drive shaft and the output shaft of the power transmission means, and
(v) the universal connection includes a female part in one of the said shafts and a male part on the other shaft swingably mounted in the female part, and includes a torsion spring disposed over and attached to the drive shaft and output shaft, the torsion spring being wound so as to contract on the shafts when the output shaft is driven to provide a driving connection between the drive shaft and output shaft in any relative angular position of said shafts.

References Cited

UNITED STATES PATENTS

| | | | |
|---|---|---|---|
| 1,796,255 | 3/1931 | White. | |
| 2,519,749 | 8/1950 | Edwards | 180—19 X |
| 2,522,112 | 9/1950 | Gilmour. | |
| 2,691,421 | 10/1954 | Swanson | 180—74 |
| 2,809,705 | 10/1957 | Sewell | 180—19 |
| 2,824,415 | 2/1958 | Frazier | 180—19 X |
| 2,944,616 | 7/1960 | Bernard et al. | 180—19 |
| 3,245,228 | 4/1966 | Stuemk et al. | 287—86 |

BENJAMIN HERSH, *Primary Examiner.*

J. A. PEKAR, *Assistant Examiner.*